United States Patent Office 3,545,850
Patented Dec. 8, 1970

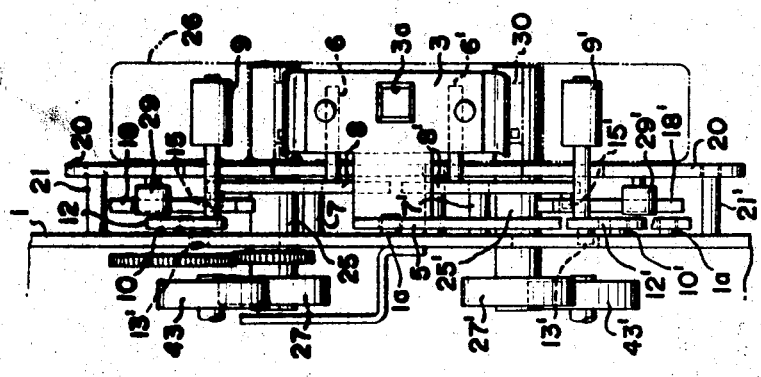
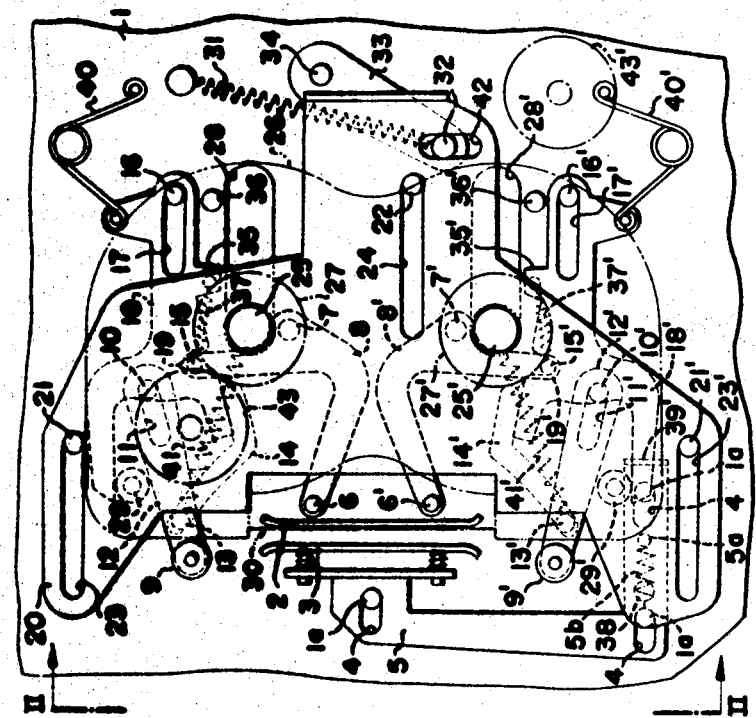

3,545,850
MACHINERY FOR HANDLING CARTRIDGE-CONTAINED FILM
Teruei Hara, Ohmiya-shi, Japan, assignor to Fuji Shashin Koki Kabushiki Kaisha, Ohmiya-shi, Saitame-ken, Japan
Filed Mar. 22, 1968, Ser. No. 715,437
Claims priority, application Japan, Mar. 28, 1967,
42/18,831, 42/18,832, 42/25,101
Int. Cl. G03b 23/02
U.S. Cl. 352—72               6 Claims

ABSTRACT OF THE DISCLOSURE

Apparatus such as cartridge-type motion-picture projectors or motion-picture cameras, which comprise a film gate, a cartridge supporting plate mounted on a frame and movable between a non-operative position and an operative position, and a lever machanism operative in such manner as to form a loop of film automatically between a cartridge on the cartridge supporting plate and the film gate when the cartridge supporting plate is moved from the non-operative position to the operative position.

BACKGROUND OF THE INVENTION

The present invention relates to a film handling maechinry such as a motion-picture projector or a motion-pitcure camera, and more particularly to such a machinery which handles a film contained in a cartridge.

With reference to motion-picture cameras in particular, a cartridge-type camera has been well known which is simple in handling and only requires a user to put a film-containing cartridge into the camera before the photographing. However, the conventional cartridge-type motion-picture cameras as described above are unexceptionally of the type wherein the film taken out from the cartridge is immediately passed through the film gate and taken-up again in the cartridge without forming a loop of film fore and aft of the film gate. However, in a motion-picture projector, formation of a film loop, fore and aft of the film gate, is essential for the prevention of blurring of the projected image and means must be provided to facilitate the formation of such film loop when a cartridge-contained film is used in the motion-picture projector. The formation of such a film loop is also necessary even in a motion-picture camera when a film is driven at a high velocity (e.g. 64 frames per minute).

The principal object of the present invention is to provide a device for a machine using a cartridge-contained film, by which a film loop is formed fore and aft of the film gate automatically after a film containing cartridge is loaded in the machine.

Another object of the present invention is to provide a device which drives a film take-up core in the cartridge in an operative position of said cartridge and drives a supply core in the cartridge in a non-operative position of said cartridge for taking up the film thereon.

Still another object of the present invention is to provide a device by which the film loops are automatically withdrawn into the cartridge when the cartridge is returned from the operative position to the non-operative position upon completion of the photographing or projecting activity.

SUMMARY OF THE INVENTION

In a machine of this invention, a supporting plate for supporting a film cartridge is mounted on a base plate, constituting a part of a fixed frame, in such a manner that it is movable between a non-operative position and an operative position. The film cartridge is mounted on the supporting plate when the latter is in the non-operative position. When the cartridge supporting plate with the cartridge thereon is moved from the non-operative position to the operative position, a film loop is formed on each of the upstream and downstream sides of the film gate automatically by lever means which is operatively associated with said supporting plate. The lever means includes a spring loaded lever which is adapted to draw a film from the cartridge by engagement with that portion of the film which is exposed from said cartridge and maintain the film loop formed on the upstream side of the film gate when the film cartridge is in the operative position. The lever means includes another spring loaded lever which is similarly adapted to maintain a film loop on the downstream side of the film gate.

The cartridge supporting plate has a pair of shafts rotatably mounted thereon to drive the supply core and the take-up core of the cartridge on engagement therewith. The arrangement is made such that the shaft for driving the supply core is operatively connected with drive means when the supporting plate is in its non-operative position, while the shaft for driving the take-up core is operatively connected with said drive means when said supporting plate is in its operative position.

The cartridge supporting plate is also provided with means which drives the shaft in engagement with the supply core in accordance with the movement of said supporting plate from the operative position to the non-operative position for withdrawing the film loops into the cartridge.

Other features and advantages of the present invention will be readily apparent from the following detailed description of preferred embodiments taken in conjunction with the accompanying drawings.

BRIEF DESCRIPTION OF THE DRAWINGS

FIG. 1 is a fragmentary side view showing the critical portion of an embodiment of the present invention, in which the principle of the invention is applied to a motion-picture projector and in which a cartridge is in a forward non-operative position;

FIG. 2 is a front view as viewed in the direction of the arrows along the lines II—II of FIG. 1;

DESCRIPTION OF THE PREFERRED EMBODIMENTS

Figure 3:
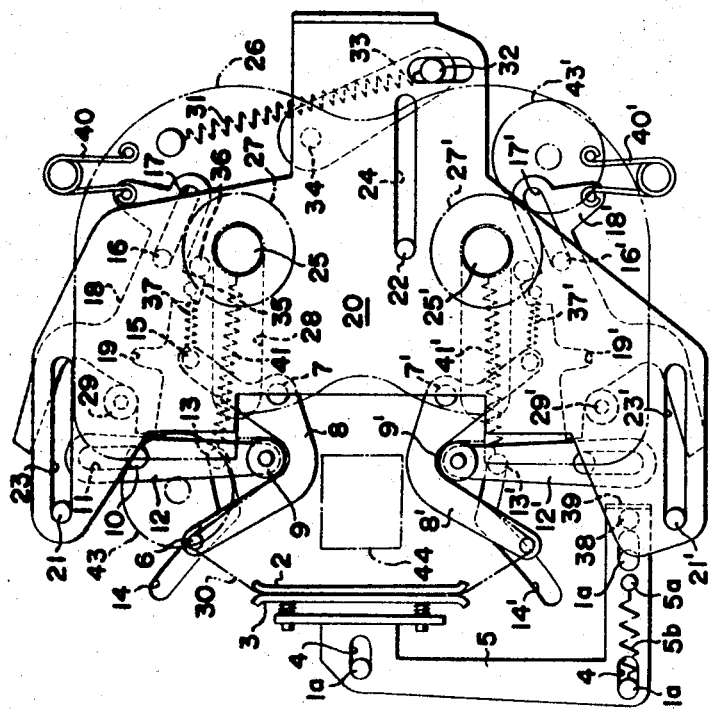
FIG. 3 is a view, similar to FIG. 1, wherein the cartridge has been moved to a backward operative position.

Referring to the drawings, particularly to FIGS. 1 to 3 inclusive, a motion-picture projector to which the principle of the present invention is applied, includes a base plate 1 which constitutes a part of the principal body of the projector. On the forward portion of the base plate 1 is fixed a film gate plate 2 defining a passage for a film. The film gate plate 2 has a rectangular aperture opening (not shown) formed therein for the passage of an image projecting light therethrough. Intermittent film advancing means (not shown in the figures for simplicity) is provided adjacent the gate plate 2, which is of the structure well known in the art and will not be described in detail herein. A film pressing plate 3 is arranged in opposed relation to the film gate plate 2. The film pressing plate 3 has an aperture opening 3a formed therein in register with the aperture opening in the gate plate 2. This film pressing plate 3 is flexibly supported by a supporting arm 5 which is movable to the left and right as viewed in FIG. 1 within a limited range by the engagement of a slot 4 with a pin 1a fixed to the base plate 1. The supporting arm 5 is biased to the left as viewed in FIG. 1 by a spring 5b which has the opposite ends connected to a pin 5a provided on said supporting arm and one of pins 1a on the base plate 1.

On the base plate 1 are provided a pair of substantially L-shaped levers 8, 8' which are pivotally mounted on pivot pins 7, 7' respectively at the central portions of one of the arms thereof. The levers 8, 8' respectively carry pins 6, 6' at those ends closer to the film gate plate 2 and pins 15, 15' at the other ends. Provided above the film gate plate 2 is a lever 12 which has a roller 9 at one end and a slot 11 formed in the other end, said slot being in engagement with a pin 10 fixed on the base plate 1. The lever 12 also carries a pin 13 at an intermediate portion thereof which is in engagement with a flexed slot 14 formed in the base plate 1. Below the film gate plate 2 is provided a lever 12' in symmetrical relation to the aforesaid lever 12 which, similar to the lever 12, carries a roller 9' at one end and is held in position by the engagement of a slot 11' formed therein with a pin 10' on the base plate 1 and a pin 13' provided thereon with a slot 14' formed in the base plate 1.

Further, a movable cartridge supporting plate 20 is provided on the base plate 1 with a predetermined space therebetween. The movable cartridge supporting plate 20 has a pair of elongate slots 23, 23' formed in the upper and lower portions thereof and an elongate slot 24 formed in the backward portion, that is a portion on the right hand side of FIG. 1, and is movable to the left and right as viewed in FIG. 1 with said slots in engagement with pins 21, 21' and 22 on the base plate 1 respectively. A pair of vertically spaced shafts 25, 25' are rotatably supported on the cartridge supporting plate 20 extending at right angles thereto. The shafts 25, 25' have one end thereof extending through respective slots 28, 28' formed in the base plate 1 to project outwardly from the backside of said base plate, and friction wheels 27, 27' are connected to the end extremities of the respective shafts. The other ends of the shaft 25, 25' project from the cartridge supporting plate 20 and are formed with splines for engagement with the film cores of a film cartridge 26 to drive the same as will be described later. Above the shaft 25 is provided a bifurcated lever 18 which is interposed between the cartridge supporting plate 20 and the base plate 1 with a slot 17, formed in one end thereof, in engagement with a pin 16 on the base plate 1, so that the bifurcated arms thereof are movable forwardly, that is, to the left as viewed in FIG. 1. The lower edge of the upper arm of the bifurcated lever 18 is substantially horizontal and defines a channel-shaped space between it and the lower arm of said lever. The lower edge of the bifurcated lever 18 forms a notch 19 and a lug 35, and the notch 19 receives the pin 15 on the lever 8 when said lever 18 is in an advanced position. On the base plate 1 is provided a stop pin 36 which will engage the pin 35 on the lever 18 to limit the backward movement of said lever 18 when said lever has moved a predetermined distance backwardly. The lever 18 is connected with the pin 15 on the lever 8 by a spring 37 and urged to the advanced position by a spring 40. The cartridge supporting plate 20 also carried thereon a roller 29 adapted to slide on the upper edge of the upper arm of the lever 18. A lever 18', similar to the lever 18, is arranged below the rotary shaft 25' in symmetrical relation to said lever 18. The portions of the lever 18' are indicated by the same prime numerals as those of the corresponding portions of the lever 18. The pin 13 on the lever 12 is connected with the cartridge supporting plate 20 by a spring 41, while the pin 13' on the lever 12' is connected with said cartridge supporting plate 20 by a spring 41'. The supporting arm 5 for the film pressing plate 3 has the rear end of the lower portion thereof flexed perpendicularly as at 39, while the cartridge supporting plate 20 is provided with a pin 38, so that when the cartridge supporting plate 20 is moved a predetermined distance backwardly, the pin 38 engages the flexed end portion 39 of the arm 5 to thereby move said arm 5 backwardly.

The base plate 1 also has a cartridge supporting plate operating lever 33 mounted on a shaft 34 which is revolved by a suitable handle (not shown). The lever 33 carries a pin 32 at its free end which is in engagement with a slot 42 formed in the cartridge supporting plate 20. A spring 31 is connected to the pin 32 at one end so that the cartridge supporting plate 20 is positively held in either an advanced position or a retracted position by the over-center action of said spring.

The motion-picture projector shown is provided with a drive wheel 43 which will drive the friction wheel 27 on the shaft 25 in engagement therewith when the cartridge supporting plate 20 is in the advanced position as shown in FIG. 1, and a drive wheel 43' which will drive the friction wheel 27' on the shaft 25' in engagement therewith when said cartridge supporting plate 20 is in the retracted position as shown in FIG. 3.

The motion-picture projector of the construction described above will operate in the following manner.

The film cartridge 26 is mounted on the movable cartridge supporting plate 20 by engaging the film cores (not shown) thereof with the respective shafts 25, 25', while holding said cartridge supporting plate 20 in the forward nonoperative position as shown in FIG. 1. In this case, that portion 30 of the film which is drawn from he cartridge is trailed along the engaging surface of the film gate plate 2. The film cartridge shown is of the same configuration as the film magazine described in U.S. Pat. No. 3,334, 835 but it may be of a different configuration. The cartridge supporting plate 20 may be provided with clamp means for holding the cartridge 26, which clamp means is not shown in the figures.

After mounting the cartridge 26 in the manner described, a handle (not shown) is operated to revolve the lever 33 counterclockwise about the shaft 34, whereby the cartridge supporting plate 20 is moved to the right as viewed in FIG. 1. As the cartridge supporting plate 20 is moved to the right, the lever 12 is caused to rotate about the pin 10 by being pulled by the cartridge supporting plate 20 through the spring 41, with the pin 13 sliding in the slot 14. As a result, the roller 9 at one end of the lever 12 is brought into contact with the film 30 at a point intermediate between the cartridge 26 and the top end of the film gate plate 2. On this occasion, the roller 29 on the cartridge supporting plate 20 moves along the lower edge of the upper arm of the lever 18 and reaches the bottom of the channel-shaped space formed between the upper and lower arms of said lever 18. As the cartridge supporting plate 20 is moved further rightwardly, the roller 29 causes the lever 18 to the right against the action of a spring 40. Upon rightward movement of the lever 18, the lever 8 is rotated clockwise about the pin 7 since the pin 15 provided at the top end of said lever 8 is in engagement with the notch 19 in the lever 18. Thus, the pin 6 on the lever 8 is moved upwardly and brought into contact with the film 30 at a point between the roller 9 on the lever 12 and the film gate plate 2, whereby the film 30 is displaced upwardly to form a film loop. When the lever 18 has been moved a predetermined distance rightwardly, the lug 35 thereof abuts against the pin 36 and thereby a further rightward movement of the lever is prevented. Upon further movement of the cartridge supporting plate 20 to the right, the lever 18 is pushed to the right by the roller 29 and rotated about the pin 36 clockwise. Therefore, the pin 15 on the lever 8 is disengaged from the notch 19 in the lever 18 and the lever 8 is held in a balanced state under the action of the spring 37 which urges said lever to rotate clockwise and the force of the film 30 which urges said lever to rotate counterclockwise. In the manner described, a loop of film is automatically formed above the film gate plate 2. A loop of film is also formed below the film gate plate 2 in exactly the same manner. The lever 33 and therefore the cartridge supporting plate 20 are held in this operative position (the position shown in FIG. 3) by the overcenter action of the spring 31. As the cartridge supporting plate 20 approaches the terminal end of its rightward stroke, the pin 38 on said cartridge supporting plate comes in engagement with the flexed end 38 of the supporting arm 5 to cause said supporting arm to move to the right, so that the film pressing plate 3 is pressed against the film gate plate 2. In the position shown in FIG. 3, the friction wheel 27' on the shaft 25' is in engagement with the drive wheel 43' to be driven thereby and therefore the film take-up core in the cartridge is driven to take up the film.

The light from a light source is projected in a direction at right angles to the faces of the sheets on which FIGS. 1 and 3 are denoted respectively and reflected forwardly through an angle of 90 degrees on a mirror, indicated at 44 in FIG. 3, to pass through the opening in the film gate plate 2, the film 30 and the opening 3a in the film pressing plate 3. The film 30 is advanced intermittently in a known manner by the intermittent advancing means of a conventional structure provided in the proximity of the film gate plate 2. The mirror 44 is held in its retracted position when the cartridge supporting plate 20 is in the non-operative position shown in FIG. 1 but is positioned in the light path when said cartridge supporting plate is moved into the position shown in FIG. 3. Such movement of the mirror is preferably effected automatically by a known mechanism but the mirror may be placed in the operative position manually as required.

Upon completion of the motion-picture projection, the lever 33 is revolved clockwise by the handle (not shown), whereupon the cartridge supporting plate 20 and all of the parts associated therewith are returned to their original positions shown in FIG. 1 so as to provide for rewinding of the film in the cartridge by the driven from the drive wheel 43 through the friction wheel 27. During the return movement of the cartridge supporting plate 20 from the position shown in FIG. 3 to that shown in FIG. 1, the film loops formed above and below the film gate plate 2 are preferably automatically drawn into the cartridge 26 and mechanisms for this purpose are shown in FIGS. 4, 5 and 6.

Figure 4:
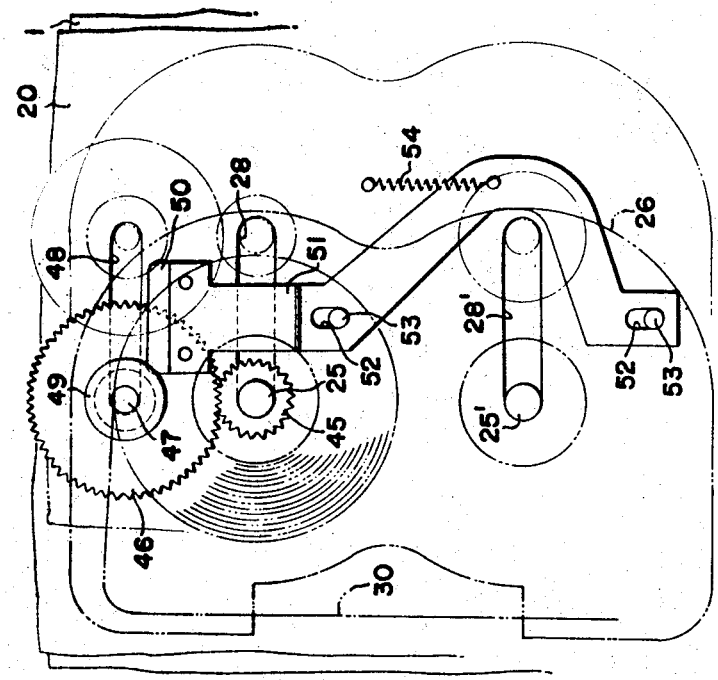
FIG. 4 is a diagrammatical view showing a mechanism for withdrawing film loops into the cartridge when the cartridge is moved to the forward non-operative position upon completion of the image projecting activity.

In the mechanism illustrated in FIG. 4, a gear 45 is fixedly mounted on the shaft 25 between the base plate 1 and the friction wheel 27 and another gear 46 meshing with said gear 45 is mounted on a shaft 47 between the base plate 1 and the cartridge supporting plate 20, said shaft 47 having one end extending through a slot 48 formed in said base plate and the other end rotatably supported by said cartridge supporting plate. Also fixedly mounted on the shaft 47 is a wheel 49 which is adapted to be brought into contact with the wheel 49 during movement of the cartridge supporting plate 20 from the operative position to the non-operative position to rotate the same is carried on a supporting arm 51 which is mounted on the base plate 1 by the engagement of a pair of slots 52 with respective pins 53. The rail 50 is resiliently urged against the wheel 49 under the action of a spring 54. Thus, it will be understood that, when the cartridge 26 is moved from the non-operative position to the operative position, the wheel 49 is rotated clockwise by the rail 50 in contact therewith and the rotation of the wheel 49 is transmitted to the shaft 25 through the gears 46 and 45, rotating the film supply core counterclockwise, whereby the film is unreeled from the cartridge only in a length required for the formation of a loop. Similarly, the film loop is withdrawn into the cartridge when the cartridge supporting plate 20 is moved from the right to left.

Figure 5:
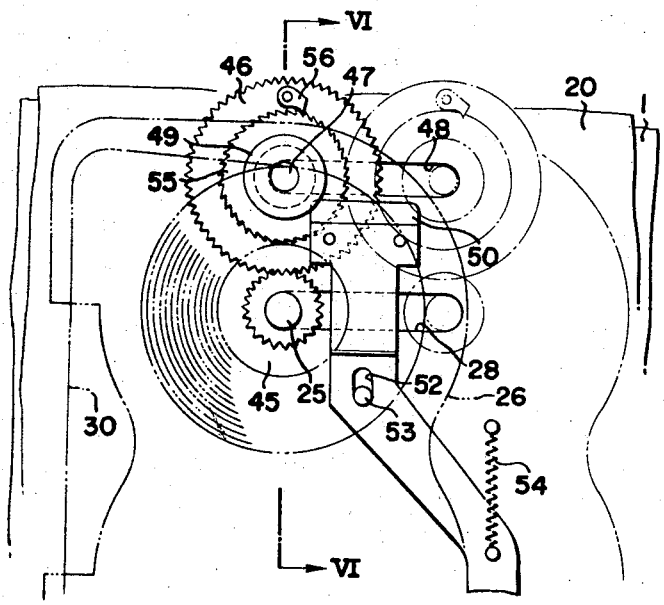
FIG. 5 is a view, similar to FIG. 4, showing another form of the mechanism for withdrawing the film loops into the cartridge.
Figure 6:
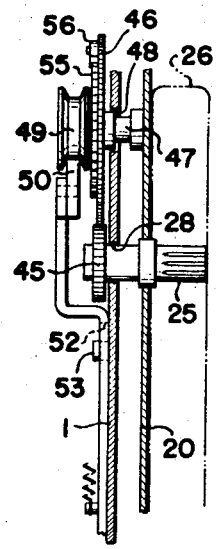
FIG. 6 is a cross sectional view taken on the line VI—VI of FIG. 5.

Another form of the mechanism is shown in FIGS. 5 and 6. According to this form, the gear meshing with the gear 45 is rotatably mounted on the shaft 47, and the shaft 47 and the gear 46 are engaged with each other through a one-way clutch composed of a ratchet wheel 55 fixed to the shaft 47 and a ratchet pawl 56. Therefore, the gear 46 is rotated along with the shaft 47 when said shaft is rotated in a counterclockwise direction but will not be rotated when said shaft 47 is rotated in a clockwise direction. With the mechanism of this form, therefore, the shaft 25 will not be rotated by the wheel 49 when the cartridge 26 is moved from the left to right and the length of the film 30 required for the formation of a loop is pulled out of the cartridge by an external force. When the cartridge 26 is moved from the right to left, the shaft 26 and therefore the film core are driven from the wheel 48 through the ratchet mechanism and the gears 46, 45, and thus the film loop is reeled up in the cartridge. In either of the forms shown in FIG. 4 and the form shown in FIGS. 5 and 6, the arrangement is made such that the wheel 49 is disengaged from the rail 50 in the non-operative and operative positions of the cartridge supporting plate 20.

Although the present invention has been described and illustrated hereinabove with reference to a specific embodiment wherein the invention is applied to a motion-picture projector, it is to be understood that the principle of the invention can also be applied to a motion-picture camera and further that many changes and modifications may be made to the detailed structure described herein.

I claim:

1. A machine for handling a cartridge-contained film, said machine comprising a frame and a film gate provided on said frame, a cartridge supporting plate movable between a forward non-operative position and a backward operative position, means for moving said cartridge supporting plate in a fore-and-aft direction, and lever means operative in response to the movement of said cartridge supporting plate from said forward non-operative position to said backward operative position in such a manner that it engages a film at a point intermediate between a cartridge mounted on said cartridge supporting plate and said film gate to form a loop of film, all of said component parts being arranged on said frame, said lever means consisting of a first lever for engaging the film at a point intermediate between said cartridge and said film gate and deflecting the same in one direction in an initial stage of the movement of said cartridge supporting plate from said forward non-operative position to said backward operative position, and a second lever for engaging the film at a point intermediate between said first lever and said film gate successively after the engagement between the first lever and the film and deflecting the same in a direction opposite to the direction in which said film is deflected by said first lever.

2. A machine as set forth in claim 1, wherein said second lever is spring loaded in such a way as to push the film in said opposite direction to maintain the film loop when the cartridge supporting plate is in said backward operative position.

3. A machine for handling a cartridge-contained film, said machine comprising a frame and a film gate provided on said frame, a cartridge supporting plate movable between a forward non-operative position and a backward operative position, means for moving said cartridge supporting plate in a fore-and-aft direction, and lever means operative in response to the movement of said cartridge supporting plate from said forward non-operative position to said backward operative position in such a manner that it engages a film at a point intermediate between a cartridge mounted on said cartridge supporting plate and said film gate to form a loop of film, all of said component parts being arranged on said frame, said cartridge supporting plate having a pair of shafts rotatably mounted thereon for driving a film supply core and a film take-up core in the cartridge respectively and said shaft to drive said film take-up core is operatively connected with a drive source for taking up the film being advanced by said intermittent film advancing means when said cartridge supporting plate is in the operative position, while said shaft to drive said film supply core is operatively connected with the drive source for unreeling the film on said film supply core when said cartridge supporting plate is in the non-operative position.

4. A machine for handling a cartridge-contained film, said machine comprising a frame and a film gate provided on said frame, a cartridge supporting plate movable between a forward non-operative position and a backward operative position, means for moving said cartridge supporting plate in a fore-and-aft direction, and lever means operative in response to the movement of said cartridge supporting plate from said forward non-operative position to said backward operative position in such a manner that it engages a film at a point intermediate between a cartridge mounted on said cartridge supporting plate and said film gate to form a loop of film, all of said component parts being arranged on said frame, a shaft rotatably mounted on the cartridge supporting plate for driving a film core of the cartridge, a rail fixed to the frame, a wheel rotatably supported on said cartridge supporting plate and rotated by said rail in contact therewith as said cartridge supporting plate moves and means for transmitting the rotation of said wheel to said shaft.

5. A machine as set forth in claim 4, wherein said film core is a supply core and said shaft is driven in such a manner that the film is unreeled from the supply core when said cartridge supporting plate is moved from the forward position to the backward position and reeled on the supply core when said cartridge supporting plate is moved from the backward position to the forward position.

6. A machine as set forth in claim 4, wherein said film core is a supply core and said shaft is connected to said wheel through a one-way clutch so that the rotation of said wheel may be transmitted to said shaft only when said cartridge supporting plate is moved from the backward position to the forward position.

References Cited

UNITED STATES PATENTS

| | | | |
|---|---|---|---|
| 2,474,972 | 7/1949 | Coutant | 352—78 |
| 3,300,270 | 1/1967 | Finnerty | 352—72X |

FOREIGN PATENTS

| | | | |
|---|---|---|---|
| 778,497 | 12/1934 | France | 352—72 |

JOHN M. HORAN, Primary Examiner

M. H. HAYES, Assistant Examiner

U.S. Cl. X.R.

352—14, 159